United States Patent [19]
Fritzsche

[11] 3,811,375
[45] May 21, 1974

[54] ELECTRIC BROILER
[75] Inventor: Donald E. Fritzsche, Chicago Heights, Ill.
[73] Assignee: General Electric Company, Indianapolis, Ind.
[22] Filed: May 16, 1972
[21] Appl. No.: 253,803

[52] U.S. Cl. ................................. 99/425, 99/446
[51] Int. Cl. .......................................... A47j 37/06
[58] Field of Search ..................... 99/425, 339–340, 99/378, 390, 422, 444–449, 450; 219/412, 413, 443, 448, 524–525

[56] References Cited
UNITED STATES PATENTS

| | | | |
|---|---|---|---|
| 2,247,626 | 7/1941 | Ames | 99/446 UX |
| 3,023,298 | 2/1962 | Wells | 99/446 |
| 3,125,659 | 3/1964 | Welch | 219/412 X |
| 3,166,006 | 1/1965 | Lennox | 99/446 |
| 3,392,664 | 7/1968 | Rosa | 99/425 X |
| 3,604,896 | 9/1971 | Anderson | 219/412 |
| 3,610,883 | 10/1971 | Holtkamp | 219/413 |

Primary Examiner—Robert W. Jenkins
Assistant Examiner—Arthur O. Henderson

[57] ABSTRACT

A broiler includes a grill assembly which is rotatably mounted for movement between a cooking position and a cleaning position. There is a latching arm which moves into interferring relationship with the grill assembly when the grill assembly is moved to its cleaning position for holding the grill assembly in this position. The latching arm is manually moveable out of the interferring relationship to allow return of the grill assembly to its cooking position. Electrically energized heating elements for heating the grill are connected to a source of electric energy through a control circuit. A first branch of the control circuit, including a regulator for limiting the effective, amount of electric energy provided to the heating elements, is used during cooking. A second branch circuit allows full available electric energy to be provided to the heating elements and includes a position sensitive switch mounted from the grill assembly. The position sensitive switch is closed only when the grill assembly is in its cleaning position. The grill assembly is rotatably mounted to the top portion of a housing which has a grease receptacle in its lower portion. A heat reflector, in the form of a dished sheet, is mounted in the open top of the housing below the grill. A similarly dished shaped grease guide is positioned between the heat reflector and the grease receptacle. The heat reflector and grease guide have mutually offset openings and the opening in the grease guide is in direct communication with the grease receptacle.

10 Claims, 6 Drawing Figures

PATENTED MAY 21 1974  3,811,375

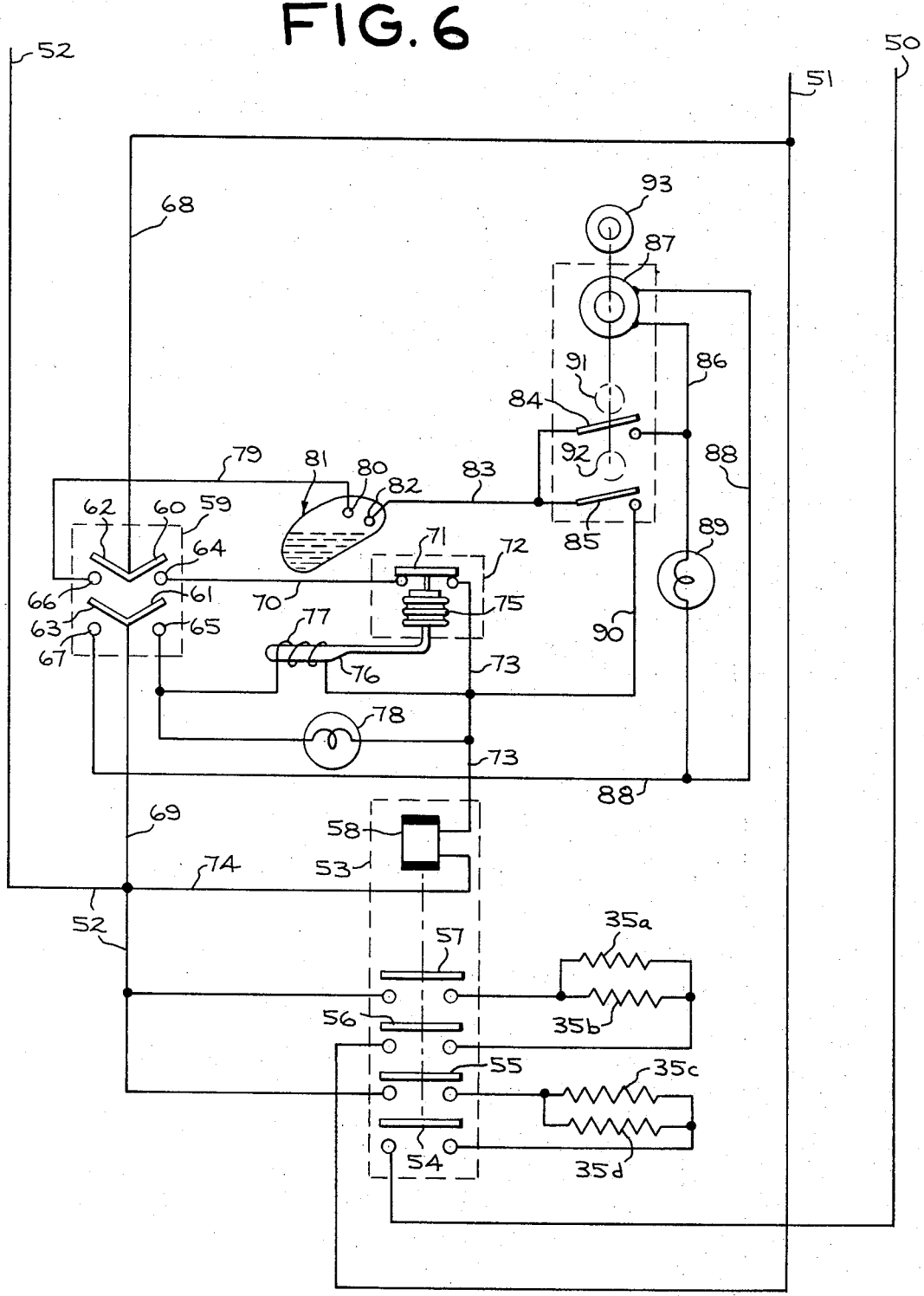

ELECTRIC BROILER

BACKGROUND OF THE INVENTION

This invention relates generally to electrically heated broilers. There have been a number of char broilers manufactured, including a number of designs which utilize electrically energized heating elements for cooking or broiling food. One problem which has plagued the prior art devices, particularly those which are designed for commercial use, has been the problems attendant to cleaning. For instance with most such units in the past it has been necessary to remove the grills from the broiler and soak them for a long period of time, after which they are scraped or brushed with a stiff bristle or metal brush. Then the grill must be reassembled before it is used again. Obviously this requires that the broiler be out of service for a long period of time each time it is cleaned.

During cooking of meat fat contained in the meat melts and drips through and off of the grill. For efficient operation, particularly in a commercial environment this grease should be collected in a receptacle or reservoir so that it can be disposed of after it has become relatively cool. Quite often individual droplets of such grease will actually be on fire as they leave the grill and provision must be made to prevent such excessively hot grease from entering the grease reservoir until it has had an opportunity to cool sufficiently that it will not cause previously collected grease to catch on fire. On the other hand, the grease reservoir and the elements guiding the grease to the reservoir should be easily accessible and quickly cleaned and, at the same time. they should be structured and arranged to prevent burning of collected grease.

SUMMARY OF THE INVENTION

It is accordingly an object of this invention to provide an improved broiler.

It is another object of the present invention to provide an improved broiler which is easily and quickly cleaned.

It is a further object of this invention to provide an electrically heated broiler in which the food supporting and cooking grill is cleaned by pyrolytic action.

It is yet another object of the present invention to provide such an improved broiler in which accidental attempts to use the broiler for cooking during a cleaning operation are prevented.

The above-mentioned and other features and objects of this invention as well as one manner of attaining them will become more apparent and the invention itself will be better understood by reference to the following description of one embodiment of the invention taken in conjunction with the accompanying drawings, wherein:

BRIEF DESCRIPTION OF THE DRAWINGS

FIG. 6 is a schematic wiring diagram of a control circuit suitable for use with the char broiler of FIG. 1.

DESCRIPTION OF THE PREFERRED EMBODIMENTS

Figure 1:
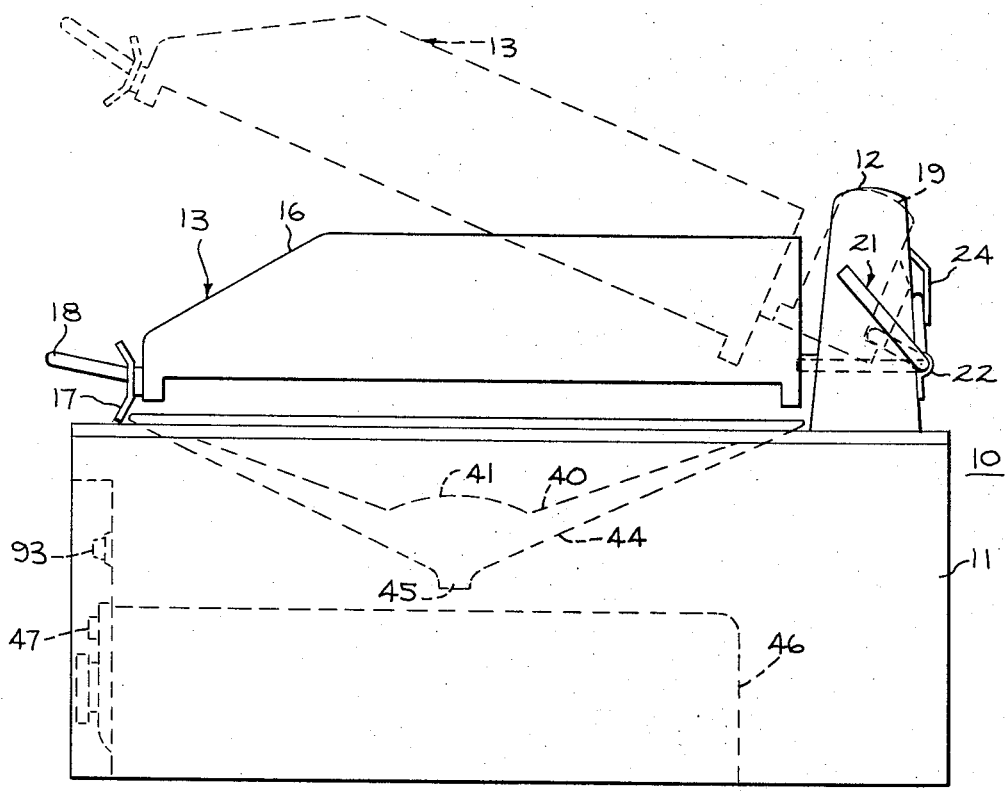
FIG. 1 is a side elevational view of an electrically energized char broiler incorporating one form of the invention, the view being somewhat schematic in form.

Referring now to the drawings, and particularly to FIGS. 1–5, there is shown in somewhat schematic form an electric char broiler 10 incorporating one form of the present invention. The broiler 10 includes a generally rectangular housing 11 which conveniently may be constructed from sheet metal. The major portion of the top of the housing is open while at the upper back of the housing there are provided two spaced apart support trunnions 12.

Figure 3:
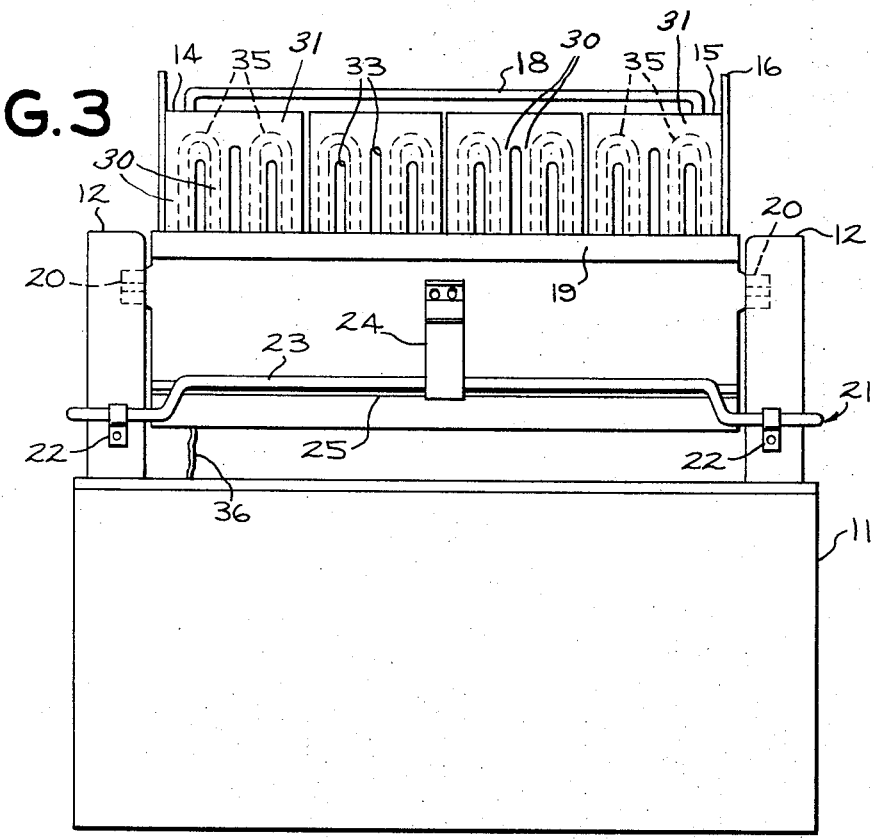
FIG. 3 is a rear elevational view similar to FIG. 2, but with the grill assembly elevated;
the grill assembly elevated

A food supporting and cooking grill assembly is generally indicated at 13. The grill assembly conveniently may include two grill sections 14 and 15 (as best seen in FIG. 3); a splashguard 16, which extends along the sides and backs of the grill sections; a front support 17, and a handle 18. The grill sections 14, 15 are formed from a good heat conducting material and preferably may be of cast iron or steel. The rear of the grill sections are supported in an escutcheon 19. The escutcheon 19 is pivotally supported in the trunnions 12 by some suitable means such as the bearings 20. The grill assembly 13 has a cooking position (shown in solid line in FIG. 1) in which the grill sections are generally parallel to the open top of the housing 11 and another or cleaning position (shown in dash line in FIG. 1). The handle 18 is used to move the grill between its cooking position and its cleaning position.

A latching bar or arm 21 is pivotally supported on the back of each trunnion 12 by some suitable means such as brackets 22. Between the brackets 22 the arm 21 extends upwardly and inwardly and includes a horizontally disposed latching section 23. The latching section extends across the back of the escutcheon 19 and is held in juxtaposition to the back of the escutcheon by a keeper 24. The keeper 24 is firmly attached to the back of the escutcheon and extends downwardly over the latching section 23 and over a shallow plate or ledge 25 which extends outwardly from the back of the escutcheon. The distal ends of the arm 21 are formed as handles 26 which are dsposed along the outside of the trunnions 12.

It will be noted that the pivotal mounting of the arm 21 by the brackets 22 is displaced from the pivotal mounting of escutcheon 19 by the bearings 20. When the grill assembly 13 is raised from its cooking position to its cleaning position it rotates in a clockwise manner (as seen in FIG. 1) about the bearings 20. Since the latching section or portion 23 of the latching arm 21 is trapped between the keeper 24 and the escutcheon 19, the latching arm 21 is caused to rotate in a counterclockwise direction (as seen in FIG. 1) about the support provided by the brackets 22. The latching section 23 moves along the back of the escutcheon 19 until it engages the ledge 25. Thus the latching section 23 is formed and mounted to have an interferring relationship with the escutcheon portion of the grill assembly and will retain the grill assembly in its elevated or cleaning position. When it is desired to lower the grill assembly, it is raised slightly by handle 18 to relieve the force on the latching arm 21. The latching arm then is rotated in a clockwise direction (as seen in FIG. 1) manually so that the grill may be lowered.

As is indicated above, each of the grill sections 14, 15 is formed of cast iron or steel and includes a number of spaced apart longitudinally extending grill element 30 which may be joined together at spaced apart points by intermediate webs and end webs such as those indicated at 31 so that each grill section is a unitary structure. The upper surfaces of the grill elements support the food which is to be cooked on the broiler and openings 33 between the individual elements allow grease and other foreign matter to fall between the grill elements. There is an electrically energizeable heating means for heating the grill elements which may conventionally take the form of one or more sheathed type, electrically energized elements 35. The heating elements 35 should be adjacent the corresponding grill elements 30; however, such elements must be protected from grease and other foreign matter. To this end the grill elements are formed with downwardly opening recesses along their undersides and the heating elements 35 are received in these recesses. One particularly suitable arrangement for mounting and protecting the heating elements in the grill structure for an electrically energized broiler is shown and described in copending application Ser. No. 253,804 which is assigned to the smae assignee as the present invention. Appropriate terminals (not shown) may be provided in the escutcheon to which the heating elements are mechanically and electrically connected and power is provided to the heating elements by means of an electrical lead or conduit 36 which extends from the main portion of housing 11 into the escutcheon 19.

Figure 4:
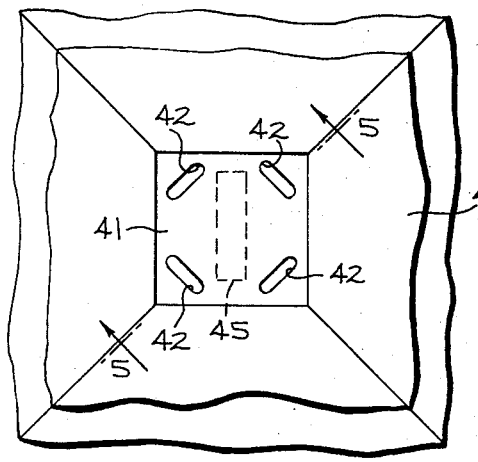
FIG. 4 is a fragmentary top plain view of a portion of the heat reflector and grease guide of the broiler of FIG. 1.
Figure 5:
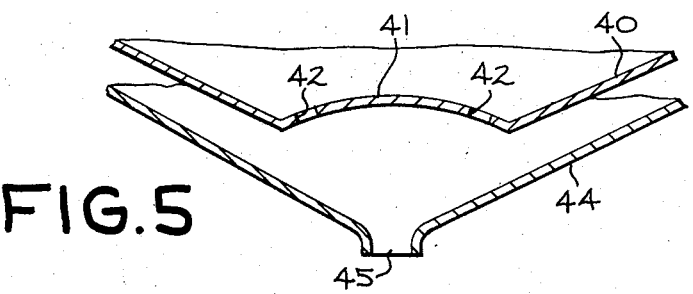
FIG. 5 is a cross-sectional view generally as seen along line 5—5 in FIG. 4.
Figure 2:
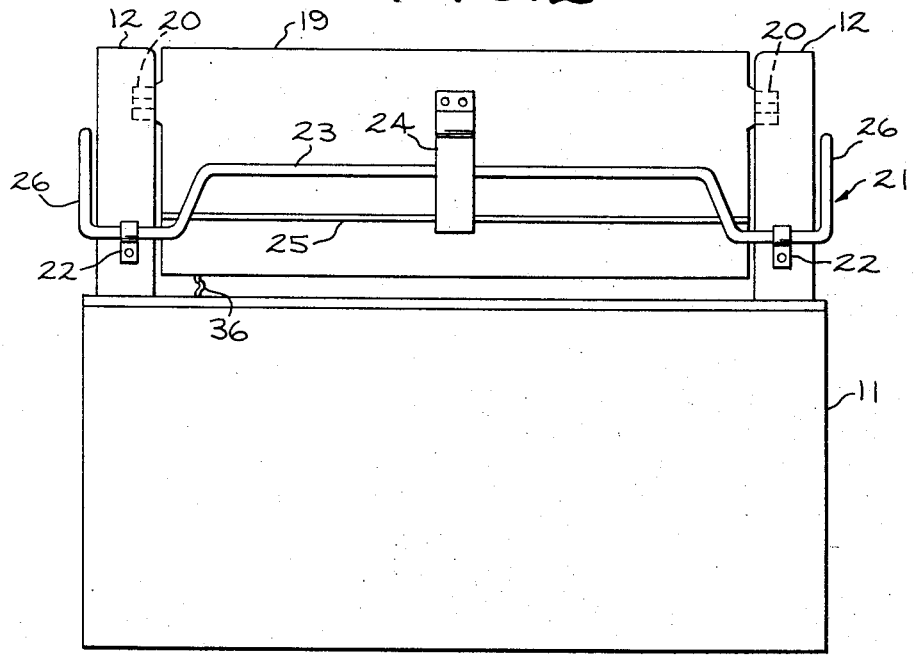
FIG. 2 is a rear elevational view on the broiler of FIG. 1.

A heat reflector 40 is mounted in the open top of the sheet metal housing 11 and extends downwardly into the housing. Conveniently the heat reflector 40 may be in the form of a downwardly dished sheet having an upper peripheral edge which engages the sheet metal housing adjacent its top opening. The bottom of the reflector is provided with a domed center section 41 which may be rectangular in outline, as best seen in FIG. 4. The domed center section 41 is provided with four openings 42 which, in the exemplification, are placed diagonally across each of the corners of the dome section. The openings 42 allow grease and other foreign matter which has fallen from the grill assembly 13 to flow off of the reflector. A grease guide 44 is positioned below the reflector 40 and conveniently also may be formed as a downwardly dished sheet which has a upper edge attached to the housing 11 and generally underlies the reflector 40. The center of the bottom portion of the grease guide 44 is formed with an opening 45. As best seen in FIG. 4 the opening 45 is positioned below the center of the domed section 41 of the heat reflector 40 and has an area as large as the combined area of the openings 42. With this arrangement grease and other matter flowing through the openings 42 will impinge upon the grease 44 and flow along a portion of the guide 44 and then through the opening 45. A grease storage receptacle in the form of a drawer 46 is slideably mounted in the lower portion of the housing 11 so as to be disposed under the opening 45.

The heat reflector 40 serves a dual purpose. First its dished shaped reflects heat which has been radiated from the grill assembly upwardly and inwardly so that it is directed back toward the grill sections and thus the food being cooked. Any droplet of grease which may be flaming as it drops off of the grill must be allowed to cool somewhat before it is received in the grease drawer 46 so that grease accumulated in the drawer will not be ignited. The offset arrangement of the openings 42 and 45 effectively elongates the path which grease must take before it reaches the grease drawer 46. Additionally the heat reflector is cooler than the grills and the grease guide 44 is even cooler than the heat reflector since the heat reflector shields the grease guide from heat radiated by the electrically energized heating elements 35. This provides ample opportunity for any excessively hot grease or other foreign matter to cool sufficiently before it enters the grease drawer. The grease drawer then may be used to accumulate a sizeable amount of grease and other foreign matter before it is removed and emptied.

For purposes of emptying, the drawer includes a handle 47 by which the drawer is pulled from the housing 11. Also, with the present arrangement cleaning of the heat reflector and grease guide is very simple. With the grill assembly raised to its cleaning position the reflector 40 may be lifted out of the open top of the housing 11 and cleaned. This exposes the entire surface of the grease guide 41 so that it may be easily cleaned within the housing 11. However, if desired both the reflector 40 and guide 41 may be removable.

With prior art char broilers, particularly those designed for commercial use, it has been the general practice to remove the grills from the broiler and then soak and scrub them in order to clean them. The exemplification broiler may be cleaned pyrolytically by energizing the heating elements 35 to raise the grill elements to a sufficient temperature to pyrolytically clean the grills. The cleaning operation is possible only when the grill assembly 13 is raised to its cleaning position (as shown in dashed line in FIG. 1) so that a cooking operation will not accidently be begun when the grill is at its cleaning temperature (which is well above acceptable cooking temperatures). By the same token, a cleaning operation may not be conducted when the grill is in the cooking position.

Viewing now FIG. 6 a control circuit, is illustrated which, in conjunction with the heretofore described apparatus, accomplishes these operations. As indicated previously the grill assembly 13 may be heated by one or more sheathed heating elements 35. For purposes of illustration it is assumed that there are four individual heaters or heating elements 35a, 35b, 35c and 35d; with the elements 35a and 35b being connected in parallel and the elements 35c and 35d being connected in parallel. The control circuit includes the three leads 50, 51, 52 which will be connected to a suitable source of electric energy such as a 230 volt, 3 phase, 60 hertz power supply. The control circuit includes a master control switch or contractor 53. The contactor 53 includes contact sets 54, 55, 56 and 57, all of which are opened and closed simultaneously by means of a coil 58. This is a normally open contactor, that is the contacts 54–57 are open when the coil 58 is de-energized and are closed when the coil is energized. When coil 58 is energized the parallel connection of heating elements 35a and 35b is connected between the leads 51 and 52 through contacts 56 and 57 while the parallel connection of heating elements 35c and 35d is connected between the leads 50 and 52 through contacts 54 and 55. Thus all of the elements 35a–d are connected in parallel. When the coil 58 is de-energized all of the heating elements are disconnected from the leads and thus from the source of electrical energy.

The control circuit also includes a double pole selector switch 59 which has contact arms 60, 61, 62 and 63 that cooperate with stationary contacts 64, 65, 66 and 67 respectively. The junction of movable contact arms 60 and 62 is connected to the supply lead 51 through a lead 68 while the junction between movable contact arms 61 and 63 is connected through a lead 69 to lead 52. The selector switch 59 is a three position switch in which by appropriate manual operation contact arms 60 and 61 may be engaged with stationary contacts 64 and 65 respectively, contact arms 62 and 63 may be engaged with stationary contacts 66 and 67 respectively or all of the contact arms may be disengaged from their associates stationary contacts (as shown in FIG. 6).

From stationary contact 64 a branch circuit extends through a lead 70 to the switch 71 of a thermostat 72. From the other side of the switch 71 the circuit extends through a lead 73 to one side of the coil 58. From the other side of the coil the circuit extends through a lead 74 to the supply lead 52. The thermostat 72 is illustrated as being of the bulb and bellows type including a bellows 75 which is mechanically connected to the switch 71 for opening and closing the switch 71. An appropriate fluid is contained within the bulb and bellows so that when the bulb 76 is heated the fluid will expand causing the bellows to expand and open the switch. Conversely, when heat is removed from the bulb 76, the fluid will contract causing the bellows to contract and the switch 71 to close. For controlling the opening and closing of the switch 71 a heater 77, electrically connected between the lead 73 and the stationary contact 65, is wound about the bulb 76. Additionally, if desired, an indicator light 78 may be connected in parallel with the heater 77.

With the circuit thus far described, assuming it is desired to use the char broiler assembly for cooking food, the selector switch 59 is operated so that contact arms 60 and 61 engage the stationary contacts 64 and 65. A branch control circuit is completed from power lead 51 through lead 68, arm 60, contact 64, lead 70, switch 71 lead 73, coil 58 and lead 74 to power lead 52. This energizes the coil 58 which causes contacts 54, 55, 56 and 57 to close so that heating elements 35a–d are connected to the source of electrical energy and heat is applied to the grid sections 14–15. The thermostat 72 is designed to have a fast response time so that heater 77, which is connected from lead 73 through contact 65, contact arm 61 and lead 69 to lead 52 will quickly cause the fluid to expand sufficiently to open the switch 71. Once the switch 71 is opened the energy to the heater 77 is cut off and the fluid within the bulb and bellows quickly cools so that the switch 71 recloses. The bulb and bellows assembly is designed so that the thermostat 72 has a fast response time; that is the switch 71 repeatedly opens and closes so that, in effect, the switch 71 is closed only a percentage of the time that switch arms 60 and 61 are down but each period of switch 71 being opened and being closed is very short compared to a cooking time. Each time the switch 71 opens the coil 58 is de-energized and contacts 54–57 open while each time switch 71 is closed coil 58 is energized and contacts 54–47 are closed. This means that effectively substantially less than the full available electrical energy is supplied to the heating elements 35a–d and repeated opening and closing of the switch 71 is such that the heating elements heat and maintain the grills such as 14–15 at a desired cooking temperature. By way of example a suitable stable broiling temperature may be provided when switch 71 is closed about 42 percent of the time. When it is desired to terminate a cooking operation the selector switch 59 is moved so that the arms 60 and 61 are disengaged from the contacts 64 and 65. Indicator light 78, being connected from conductor 73 to conductor 52 will be on each time the heating elements 35a–d are on.

It will be understood that the particular form of thermostat 72 is for illustrative purposes only and that this arrangement may take other forms. For instance, the switch 71 could be a bimetal switch with the heater 77 being disposed directly around the switch itself. Alternatively, the switch 71 could be a self-heating bimetal; in which case the heater 77 can be eliminated. If desired, a conventional thermostat which senses and responds to the temperature of the grill assembly could be utilized. However, the self-heating thermostat arrangement is advantageous in that it may be physically mounted within the housing 11 whereas the use of a conventional thermostat sensing the temperature of the grill section 14–15 would require that the thermostat be mounted in the escutcheon 19 with the bulb adjacent one of the grill sections. Additionally, such a thermostat would be required to withstand the pyrolytic cleaning temperatures to which the heating elements are raised for cleaning the grill. With the present arrangement the control thermostat merely must be designed to withstand the temperature generated by its own heater 77.

A bypass or cleaning circuit extends from contact 66 through a lead 79 to one terminal 80 of a mercury switch 81. The other terminal 82 of switch 81 is connected through a lead 83 to a pair of timer operated switches 84 and 85. From switch 84 one lead 86 extends to a timer motor 87, the other side of which is connected by lead 88 to a stationary contact 67. A pilot light 89 is connected in parallel with the timer motor 87 between leads 86 and 88. From switch 85 a lead 90 extends to the lead 73. A pair of cams, schematically illustrated at 91 and 92, are mechanically connected to the motor 87 and are disposed to control the settings of switches of 84 and 85 so that the rotation of the cams 91, 92 by motor 87 causes the switches 84 and 85 to open and close. A control knob generally indicated at 93 is connected to the timer motor 87 for setting an appropriate period of timer operation. Conveniently the cams 91 and 92 are designed so that the switch 84 closes before and opens after switch 85.

Assuming that it is desired to clean the grill sections 14, 15 the grill assembly is rotated to its raised or cleaning position. The mercury switch 81 is position sensitive and is mounted to the grill assembly, as by being mounted in the escutcheon 19. The contacts 80, 82 are connected only when the grill assembly is in its raised position. The timer is set for a desired period of cleaning action, such as 15 minutes by way of example, by appropriate rotation of the control knob 93 which rotates the rotor of motor 87 and thus the cams 91 and 92. With this setting the switches 84, 85 are closed and will remain closed 15 minutes. Thereafter switch 85 will open and then switch 84 will open. The selector switch 59 is manually operated so that contact arms 62 and 63 engage stationary contacts 66, 67 respectively. With this arrangement a circuit is completed from lead 51 through lead 68, contact arm 62, contact 66, lead 79, mercury switch 81, lead 83, switch 85, lead 90 to lead 73. As explained before, from lead 73 the circuit extends through coil 58 and lead 74 to power lead 52. Thus the coil 58 is energized closing contacts 54, 55, 56, and 57 to connect the heating elements 35a–d between selected power leads. An additional circuit extends from lead 83 through switch 84, lead 86 to motor 87 and from the other side of the motor through lead 88, contact 67, contact arm 63 and lead 69 to the power lead 52. Thus the motor 87 is energized and rotates cams 91 and 92 to time a period of energization of the heating elements. The pilot light 89, being connected in parallel with the motor 87 energized and is on to indicated that a cleaning operation is taking place.

Full available electrical energy is continuously provided to the heating elements 35a–35b for the entire cleaning period determined by the setting of timer motor 87. Thus the temperature of the heating elements and the grill sections rises well above the cooking temperature and any accumulated grease and food matter on the grill elements 30 is removed by pyrolytic action. Upon completion of the cleaning period, previously determined by rotation of control knob 93, switch 85 is opened by cam 92 to de-energize coil 58. This causes contacts 54-57 to open and de-energize heating elements 35a–d. Almost immediately thereafter switch 84 is opened by cam 91 to de-energize motor 87 and pilot light 89. If it is determined that a sufficient cleaning time has not been set, the timer may be reset by rotation of control knob 93 and it will repeat the cleaning operation.

Once the cleaning operation is completed the grill assembly may be lifted slightly by handle 18, latching arm 21 moved out of interferring relationship with the escutcheon 19 and the grill lowered to its generally horizontal cooking position. In the event the user has forgotten to reset the selector switch 59 no harm is done since, in the cleaning setting arms 62 and 63 engage with contacts 66 and 67 and the circuit can be completed only through the mercury switch 81. The mercury switch 81 is mounted to the grill assembly and is position sensitive so that its contacts are open when the grill assembly is in its cooking position. To obtain a cooking operation the selector switch is moved to its other extreme position, that is with arms 60, 61 engaging contacts 64, 65 respectively.

While, in accordance with the patent statutes, I have described what at present is considered to be the preferred embodiments of my invention. It will be obvious to those skilled in the art that various changes and modifications may be made therein without departing from the invention, it is therefore aimed in the appended claims to cover all equivalent and variations that fall within the true spirit and scope of the invention.

What I claim as new and desire to secure by Letters Patent of the United States is:

1. An electrically energized broiler, including:
   a. a grill assembly for supporting food to be cooked; said grill assembly having a cooking position and a cleaning position removed from its cooking position;
   b. electrically energized heating means for heating said grill assembly;
   c. a control circuit for connecting said heating means to a source of electric energy; said control circuit including regulating means for limiting the effective amount of electrical energy supplied to said heating means; said control circuit further including by-pass means for allowing full available electric energy to be supplied to said heating means, said by-pass means being effective for allowing application of full available electric energy to said heating means only when said grill assembly is in its cleaning position.

2. An electrically energized broiler as set forth in claim 1, further including latching means for releasably holding said grill assembly in its cleaning position.

3. An electrically energized broiler as set forth in claim 1 wherein said by-pass means includes a position sensitive switch, said switch being connected to said grill assembly so as to be in its closed position only when said grill assembly is in its cleaning position.

4. An electrically energized broiler as set forth in claim 1 in which said control circuit includes timing means connected in circuit with said by-pass means and effective to interrupt the supply of electric energy to said heating means after application of full available electrical energy to said heating means for a predetermined period of time.

5. An electrically energized broiler as set forth in claim 1, wherein said control circuit includes:
   a. a master switch means having master contact means connected in series with said heating means so that said heating means is energized only when said master contact means is closed, said master switch means also having a control coil connected to said contact means for closing said contact means only when said control coil is energized;
   b. a cooking branch circuit for connecting said control coil to a source of electric energy in series with the switch of a thermostat means; said thermostat means repeatedly opening and closing its switch for causing repeated opening and closing of said master contact means so that the effective amount of electric energy provided to said heating means is limited;
   c. a by-pass branch circuit for connecting said control coil to a source of electric energy in series with the switch of a timer for allowing said master contact means to be closed for an extended period to provide full available electric energy to said heating means, said timer thereafter being effective to open said timer switch for de-energizing said heating means; said by-pass branch circuit further including a position sensitive switch, said position sensitive switch being mounted from said grill assembly so as to be in its closed position only when said grill assembly is in its cleaning position; and
   d. a manually operable selector switch effective to selectively connect one of said cooking branch circuit and said by-pass branch circuit to a source of electric energy.

6. A broiler assembly including:
   a. an open top housing;
   b. a grease receptacle mounted in the lower portion of said housing;
   c. heat reflector means positioned in said housing above said grease receptacle, said heat reflector means defining at least one opening therein for passage of grease to said grease receptacle;

d. a grill assembly for supporting food to be cooked; said grill assembly being rotatably mounted for movement between a cooking position, in which it is disposed substantially across the open top of said housing, and a cleaning position, in which it is rotated upwardly from its cooking position; and e. latching means for releasably holding said grill assembly in its cleaning position.

7. A broiler assembly as set forth in claim 6, wherein said latching means includes a latching arm mounted to have an interfering relationship with said grill assembly when said grill assembly is in its cleaning position, and to be manually movable from its interfering relationship with said grill assembly.

8. A broiler assembly as set forth in claim 6, wherein:

a. said housing includes a pair of spaced apart trunnions extending upwardly of the open top of said housing;

b. said grill assembly being rotatably supported by said trunnions for movement between its cooking and its cleaning positions; and c. said latching means includes a latching arm rotatably supported by said trunnions remote from the support of said grill structure, a first portion of said arm extending adjacent a corresponding portion of said grill assembly; a keeper attached to said grill assembly and overlying said first arm portion for maintaining said first arm portion adjacent said corresponding portion of said grill assembly as said grill assembly is moved to its cleaning position so that said first arm portion will come into interfering relationship with said grill assembly to hold said grill assembly in its cleaning position; said arm further including at least one handle portion for removing said first arm portion from interfering relationship with said grill assembly.

9. A broiler assembly as set forth in claim 6, further including:

a. electrically energized heating means for heating said grill assembly; and b. a control circuit for connecting said heating means to a source of electric energy; said control circuit including regulating means for limiting the effective amount of electrical energy supplied to said heating means; said control circuit further including by-pass means for allowing application of full available electrical energy to said heating means, said by-pass means including a position sensitive switch attached to said grill assembly to be in its closed position only when said grill assembly is in its cleaning position.

10. A broiler as set forth in claim 6, wherein:

a. said heat reflector means is in the form of a downwardly dished sheet having at least one opening in its lower portion; and b. a second downwardly dished sheet is mounted in said housing below said heat reflector means;

c. said second downwardly dished sheet having at least one opening in its lower portion; said at least one opening in said second sheet being offset from said at least one opening in said heat reflector means and being in direct communication with said grease receptacle.

* * * * *